(12) United States Patent
Rawlins et al.

(10) Patent No.: US 8,680,176 B2
(45) Date of Patent: Mar. 25, 2014

(54) NANOENCAPSULATION OF ISOCYANATES VIA AQUEOUS MEDIA

(75) Inventors: James W. Rawlins, Petal, MS (US); Huaxiang Yang, Hattiesburg, MS (US); Sharathkumar K. Mendon, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 721 days.

(21) Appl. No.: 12/047,450

(22) Filed: Mar. 13, 2008

(65) Prior Publication Data

US 2008/0234406 A1 Sep. 25, 2008

Related U.S. Application Data

(60) Provisional application No. 60/919,174, filed on Mar. 21, 2007.

(51) Int. Cl.
*C08K 9/00* (2006.01)
*C08G 18/81* (2006.01)

(52) U.S. Cl.
USPC .............................. 523/207; 523/201; 528/45

(58) Field of Classification Search
USPC ...................... 523/207, 201; 528/45
See application file for complete search history.

(56) References Cited

U.S. PATENT DOCUMENTS

| | | | | |
|---|---|---|---|---|
| 3,659,003 | A * | 4/1972 | Johnson | 525/124 |
| 3,969,547 | A * | 7/1976 | Isawa et al. | 427/214 |
| 4,485,193 | A * | 11/1984 | Rubens et al. | 521/58 |
| 5,204,406 | A * | 4/1993 | Fujii et al. | 525/73 |
| 5,346,954 | A * | 9/1994 | Wu et al. | 525/85 |
| 6,338,838 | B1 * | 1/2002 | Berset et al. | 424/59 |
| 6,797,761 | B2 * | 9/2004 | Bendix et al. | 524/457 |
| 7,169,832 | B2 | 1/2007 | Poppe et al. | |
| 7,279,200 | B2 | 10/2007 | Baudin et al. | |
| 2002/0099507 | A1 * | 7/2002 | Clark et al. | 702/36 |
| 2006/0002875 | A1 * | 1/2006 | Winkler et al. | 424/63 |

OTHER PUBLICATIONS

Emmanaouil et al. "Highly Reactive, Blocking Agent-Free Polyurethane Powder Coatings." pp. 1-7, Nov. 1, 2005.*
Lee et al., "Curing Behavior of Poly(vinyl Chloride)-Graft-2-Hydroxyethyl Methacrylate", Eur. Polym. J., 33(9):1499-1504 (1997).
Landfester, "The Generation of Nanoparticles in Miniemulsions", Adv. Mater, 13(10):765-768 (2001).
Couvreur et al, "Nanocapsule Technology: A Review", Critical Reviews in Therapeutic Drug Carrier Systems, 19(2):99-134 (2002).
Jang et al, "Selective Fabrication of Poly(3,4-ethylenedioxythiophene) Nanocapsules and Mesocellular Foams Using Surfactant Mediated Interfacial Polymerization", Adv. Mater, 18:354-358 (2006).
Ni et al, "Synthesis of Hybrid Nanocapsules by Miniemulsion (Co)polymerization of Styrene and y-Methacryloxypropyltrimethoxysilane", Macromolecules, 39:2529-2535 (2006).
Qi et al., "Preparation of acrylate polymer/silica nanocomposite particles with high silica encapsulation efficiency via miniemulsion polymerization", Polymer, 47:4622-4629 (2006).

* cited by examiner

*Primary Examiner* — Hannah Pak
(74) *Attorney, Agent, or Firm* — Lawrence Arthur Schemmel

(57) ABSTRACT

The present invention provides a nanocapsule of a blocked isocyanate encapsulated within a polymeric nanosphere. In one aspect, the polymeric nanosphere is functionalized. Free isocyanate functionality is released upon thermal annealing or UV exposure of the nanospheres containing the blocked isocyanate. This present invention also provides a novel method for encapsulating isocyanates in aqueous media. In one aspect, the method comprises miniemulsion polymerization. The thermally or UV deblocked isocyanate can be used as an active functional group for many potential applications.

21 Claims, 7 Drawing Sheets

NANOENCAPSULATION OF ISOCYANATES VIA AQUEOUS MEDIA

The present application claims priority to U.S. Provisional patent application No. 60/919,174 filed on Mar. 21, 2007, the entire contents of which is specifically incorporated herein by reference.

This application is based upon work supported by the Cooperative State Research, Education, and Extension Service, U.S. Department of Agriculture, under Agreement Nos. 2001-38202-10424 and 2006-38202-16954. The United States government may own some rights to this invention.

BACKGROUND OF THE INVENTION

The synthesis and application of nanoparticles, i.e., particles smaller than one micron, are of growing interest to both industry and academia. Nanocapsules, a particular type of nanoparticles, are composed of one or more active materials (core) and a protective matrix (shell). (1) Encapsulation technology has been used to prepare micro/nanocapsules with specific application properties in many areas including food (2), biology (3), and medicine (4).

Nanocapsules have been synthesized via miniemulsion (5,6) and interfacial polymerization (7,8) techniques. Couvreur reviewed nanocapsule technologies used in drug carrier systems.(9) To date, isocyanates have generally been used to form shell (or matrix) materials for encapsulating functional materials, releasable fill materials, (10) or making pressure sensitive copying paper (11). However, the inherent reactivity of isocyanates with water makes it difficult to encapsulate them in aqueous media.

SUMMARY OF THE INVENTION

The present invention provides nanocapsules comprising blocked isocyanates (BNCO) encapsulated within polymeric nanospheres. In a preferred embodiment, the polymeric nanosphere is composed of polystyrene. In one aspect, the polymeric nanospheres are functionalized. In a preferred embodiment, the polymeric nanospheres are hydroxyl, carboxyl, epoxy, amide or amine functionalized. Once the blocked isocyanates have been successfully encapsulated into polymeric nanospheres, the blocking agent can be released upon thermal treatment or UV exposure. The thermally or UV dissociated isocyanates can be utilized as an active functional group for many potential applications.

The present invention is also directed to a new method for encapsulating isocyanates. In one embodiment, the present invention provides a novel method for encapsulation of blocked isocyanates into polymeric nanocapsules in aqueous media via miniemulsion polymerization. In another embodiment, the present invention provides a new method for encapsulating isocyanates within hydroxyl, carboxyl, epoxy, amide or amine functionalized nanocapsules in aqueous media. In another aspect of the present invention, the blocking agent is released upon thermal treatment.

The nanocapsules of the present invention can be used in a variety of applications, including coatings, elastomers, composites, and rubbers.

DETAILED DESCRIPTION OF THE PREFERRED EMBODIMENTS

Figure 1:
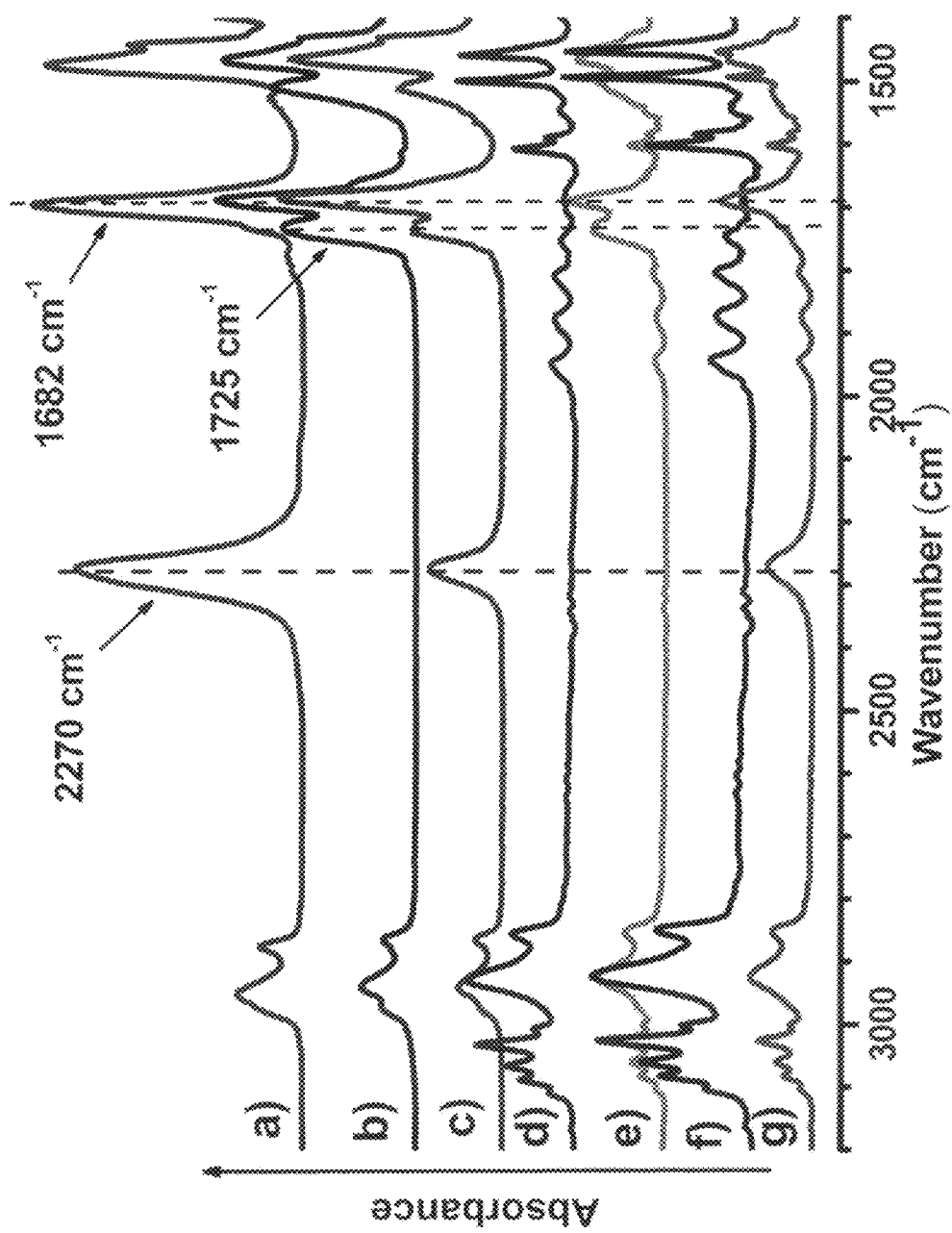
FIG. 1 depicts the FTIR spectra of a) N3300A, b) BL3175A, c) BL3175A after deblocking treatment, d) M-1, e) M-6, f) M-6 after acetone extraction, and g) M-6 after deblocking treatment.

In a preferred embodiment, blocked isocyanates are encapsulated into polystyrene nanospheres. In a more preferred embodiment, the nanocapsules are prepared via miniemulsion polymerization. In one embodiment, the blocked isocyanate is based on hexamethylene diisocyanate. Other isocyanates for use in this invention include toluene diisocyanate, methane diphenyl diisocyanate (MDI), hexamethylene diisocyanate, isophorone diisocyanate, hydrogenated MDI, trimethyl hexamethylene diisocyanate, tetramethyl xylylene isocyanate, tetramethyl xylylene diisocyanate, xylylene diisocyanate, isocyanate dimers, isocyanate trimers, polyisocyanates, polydiisocyanates, etc. The blocking agents attached to the isocyanate can be selected from a myriad of chemical groups:

1) Phenol and substituted phenol
   p-chlorophenol, o-nitrophenol, resorcinol, m-cresol, guaiacol, phloroglucinol, etc.
2) Alcohols and substituted alcohols
   methanol, 1,1,1,3,3,3-hexafluoro-2-propanol, 2-methyl-2-propanol, ethanol, butanol, cyclohexanol, and t-amyl alcohol, 1-pentanol, isopropanol, 2-ethylhexanol, 2-N,N-dimethylaminoethanol, 2-ethylhexanol, 2-ethoxyethanol, hydroxyethyl (meth)acrylate, etc.
3) Oximes
   methyl ethyl ketoxime, benzophenone oxime, acetone oxime, cyclohexanone oxime, cyclopentanone oxime, acetophenone oxime, methyl isobutyl ketone oxime, etc.
4) β-Dicarbonyl compounds
   Malonic esters, such as diethyl malonate, Acetoacetic esters, such as ethyl acetoacetate, 2,4-pentaedione, acetyl acetone, malononitrile, etc.
5) Hydroxamic acid esters
   Benzyl methacrylohydroxamate
6) Triazoles
   Benzotriazole
7) Lactams
   ε-Caprolactam
8) Aminimide, imidazolines, tetrahydropyrimidines, and imidazoles
9) Nitrile carbonates and nitrile oxides Blocked isocyanates as may be employed are described, for example, in Organischer Metallschutz: Entwicklung und Anwendung von Beschichtungsstoffen [Organic Protection of Metals: Development and Application of Coating Materials], page 159-160, Vincentz Verlag, Hannover (1993). These are compounds in which the highly reactive NCO group is "blocked" by reaction with specific radicals, such as primary alcohols, phenol, acetoacetates, .epsilon.-caprolactam, phthalimide, imidazole, oxime or amine. The blocked isocyanate is stable in liquid systems and also in the presence of hydroxyl groups. On heating, the blocking agents are eliminated and the NCO group is exposed. Blocked isocyanates can be formed by reacting any of the above mentioned blocking agents with any of the isocyanates mentioned earlier.

Blocked isocyanates are incorporated into the polymeric nanospheres during the miniemulsion process that is the substance of this patent application. Essentially, the nanospheres can be made from a wide variety of free radically polymerizable comonomers.

In another preferred embodiment, blocked isocyanates are encapsulated within functionalized nanospheres. In one embodiment, the nanosphere shell is functionalized with hydroxyl or amine. Other examples of functionalities include epoxy, amide, and carboxyl groups. In another embodiment, the nanocapsule shell is comprised of polystyrene or polystyrene copolymerized with a multifunctional monomer such as divinyl benzene. In another embodiment, the nanocapsule shell is formed via copolymerization of styrene, 2-hydroxyethyl methacrylate, and 2-(tert-butylamino)ethyl methacrylate using divinylbenzene as the crosslinker. In another embodiment, the blocked isocyanate is based on hexamethylene diisocyanate. In another embodiment, the nanocapsules are prepared via miniemulsion polymerization.

Monomers selected from the wide range of vinyl and (meth)acrylate monomers known to those skilled in the art of free radical polymerization can be employed to form the nanocapsule shell. Use of comonomers such as glycidyl methacrylate, N-isopropylacrylamide, and (meth)acrylic acid will yield functionalized nanocapsules that contain epoxy, amide, and carboxyl functionality, respectively.

In another aspect, the blocked isocyanate encapsulated within the nanocapsules are deblocked by freeze-drying the nanocapsules and treating them thermally to release the deblocking agent. In another aspect, the deblocking thermal treatment is performed isothermally. Alternatively, the deblocking can be accomplished by exposure to UV light. A detailed review of blocked isocyanates, blocking agents, and their deblocking temperatures can be found in references 13 and 14.

EXAMPLES

Example 1

Isocyanate Encapsulation into Polystyrene Nanospheres

Desmodur® BL3175A [blocked isocyanate based on hexamethylene diisocyanate and methyl ethyl ketoxime (MEKO), deblocking temperature ~135° C.], was chosen for encapsulation into polystyrene nanoparticles. The BNCO nanocapsules, prepared via miniemulsion polymerization are summarized in Table 1. Desmodur N3300A (polymeric hexamethylene diisocyanate) was employed as the control for FTIR characterization. The miniemulsion process yields nanocapsules that contain the blocked isocyanate encapsulated within the polystyrene nanocapsules.

TABLE 1

BNCO Nanocapsules

| Sample | % DVB* | % BNCO* | Particle Size (nm) |
|---|---|---|---|
| M-1 | 2 | 0 | 58 |
| M-2 | 2 | 10 | 59 |
| M-3 | 0 | 10 | 57 |
| M-4 | 2 | 20 | 59 |
| M-5 | 2 | 30 | 62 |
| M-6 | 2 | 40 | 59 |
| M-7 | 2 | 60 | 53 |
| M-8 | 2 | 80 | 82 |
| M-9 | 0 | 30 | 56 |
| M-10 | 4 | 30 | 53 |
| M-11 | 6 | 30 | 57 |

*Weight percentage on styrene.

Pre-emulsion Preparation. The pre-emulsion for nanocapsule M-6 was synthesized as follows: Part I [40 g styrene, 0.8 g divinylbenzene (DVB), 0.82 g 2,2'-azobisisobutyronitrile (AIBN), and 40 g Desmodur BL3175A)], and Part II [1.71 g sodium dodecyl sulfate (SDS), 1.63 g Igepal® CO-887 (nonyl phenol 30 mole ethoxylate), and 220 g water)] were blended magnetically in separate containers for 10 minutes at 25° C. Part II was poured into Part I under mechanical agitation, and the contents were stirred for 30 minutes at 1,800 rpm. The pre-emulsion was cooled to <5° C. before sonication using a Misonix® sonicator 3000 (until the particle size was <250 nm).

Emulsion Polymerization. The pre-emulsion was transferred to a three-neck round bottom flask equipped with a mechanical stirrer, reflux condenser, and a nitrogen inlet, and degassed for 30 minutes. The temperature was raised to 70° C. and maintained for 8 hours to complete the polymerization.

Characterization. The latex was freeze dried (lyophilization) for 48 hours in the Freezemobile 35EL. Glass transition temperatures ($T_g$s) were recorded on a differential scanning calorimeter (DSC Q1000, TA Instruments, New Castle, Del.).

For deblocking studies, the freeze dried samples were treated thermally in the DSC under a nitrogen atmosphere as summarized in Table 2 and characterized via FTIR.

TABLE 2

Deblocking Treatment Procedure

| Step | Equilibrate | Ramp to (10° C./min) | Isothermal (min) |
|---|---|---|---|
| I | −50° C. | — | — |
| II | — | 120° C. | 1 |
| III | — | −50° C. | 3 |
| IV | — | 160° C. | 40 |
| V | — | −50° C. | 3 |
| VI | — | 180° C. | — |

FTIR analysis showed characteristic peaks at 1682 (carbonyl) and 2270 $cm^{-1}$ (free isocyanate) for Desmodur N3300A, and at 1682 and 1725 $cm^{-1}$ for Desmodur BL3175A (FIGS. 1a and 1b). The characteristic BNCO peaks were visible in the FTIR spectrum of the nanocapsule, M-6 (FIG. 1e) but absent from the FTIR spectrum of the hollow nanosphere, M-1 (FIG. 1d), confirming the inclusion of BNCO in the nanocapsules. Nanocapsule M-6 was treated with acetone to extract the encapsulated BNCO. The FTIR spectrum of M-6 after acetone extraction (FIG. 1f) shows complete disappearance of the characteristic BNCO peaks indicating that the blocked isocyanate was extracted from the nanocapsules by acetone.

For deblocking studies, nanocapsules M-6 were freeze dried and treated thermally in the DSC to release the deblocking agent. FIG. 1c displays the effect of deblocking treatment on BL3175A. While the presence of the isocyanate peak at 2270 cm$^{-1}$ indicates deblocking, the peak at 1725 cm$^{-1}$ indicates that all the BNCO was not deblocked by the thermal treatment. The BNCO nanocapsule M-6 that was subjected to deblocking treatment also shows the characteristic isocyanate peak (2270 cm$^{-1}$) (FIG. 1g). The deblocking appeared to be a function of time. Therefore, BL3175A and nanocapsule M-7 (2% DVB, 60% BNCO) were heated isothermally at 140° C. for varying lengths of time (FIG. 2).

In FIG. 2a, the first curve for BL3175A (0 min) reveals a small amount of deblocked isocyanate, which indicates initiation of the deblocking process at 140° C. Subsequent spectra show the effects of isothermal heating of BL3175A for varying lengths of time. The close-up profile (FIG. 2a, area A) shows increasing intensity of the isocyanate peak with time. Even after 70 minutes at 140° C., a small peak is visible at 1725 cm$^{-1}$ (peak B) suggesting the presence of residual blocked isocyanate. Since the ATR can only probe the top 2 microns of the sample (ZnSe crystal), the deblocking of BL3175A was also analyzed via transmission FTIR between sodium chloride plates (FIG. 2b). To show the time-dependent deblocking property of BNCO, the transmission FTIR data were replotted after normalization at 1682 cm$^{-1}$. It is evident that the peak A height increases with time while that of peak B decreases. Peak B disappears after 50 minutes at 140° C.

A similar heating profile for the M-7 BNCO nanocapsule summarizes the effect of deblocking by the appearance and continued presence of deblocked isocyanate. By 120 minutes, the 1725 cm$^{-1}$ peak has almost disappeared indicating complete deblocking of the original BNCO.

Figure 3:
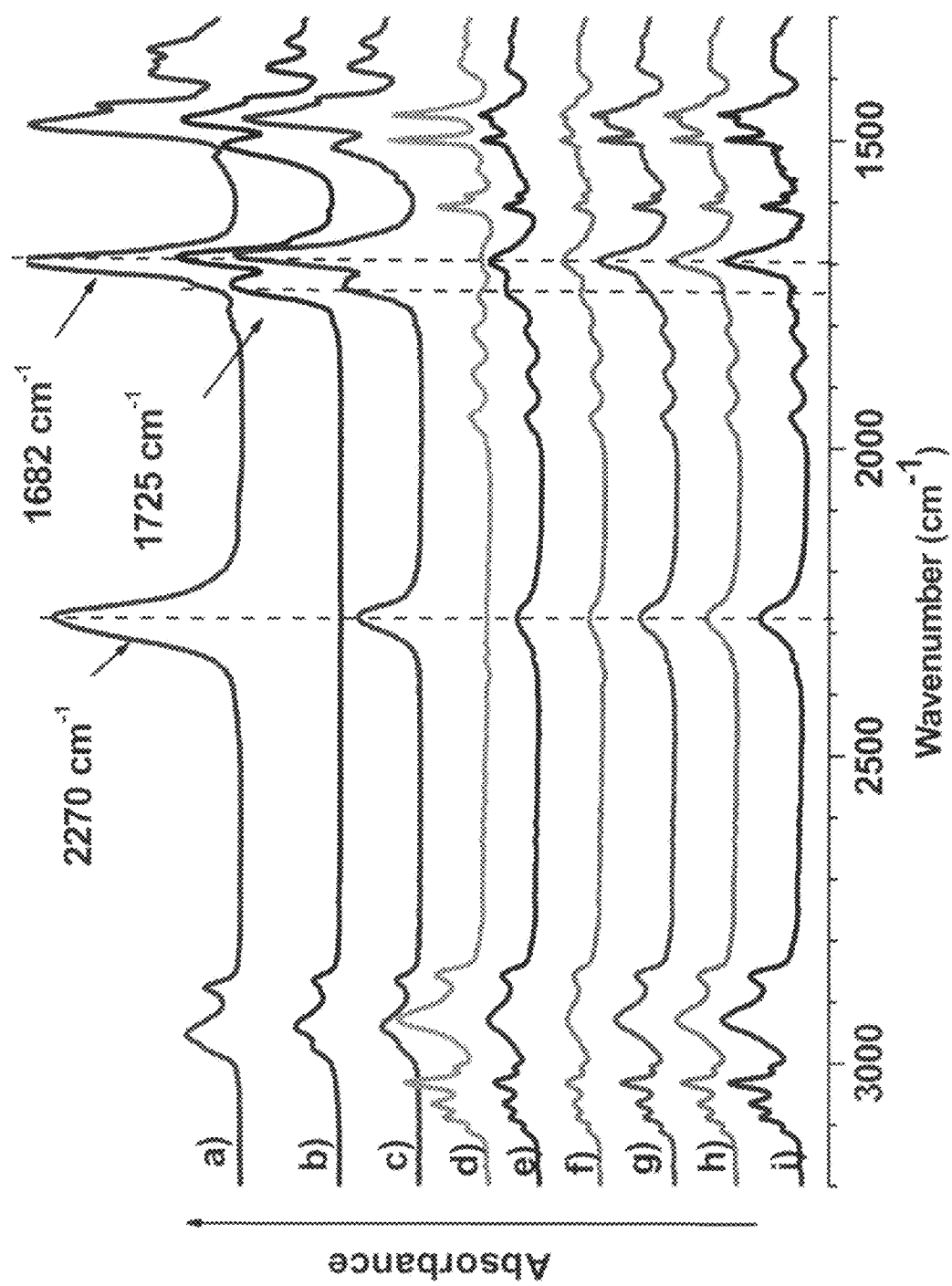
FIG. 3 depicts the FTIR spectra of a) N 3300A, b) BL3175A, c) BL3175A after deblocking treatment, d) M-1, e) M-1 and BL3175A blend after deblocking treatment, f) M-9 after deblocking treatment, g) M-5 after deblocking treatment, h) M-10 after deblocking treatment, and i) M-11 after deblocking treatment.

Lee suggested that the blocking and deblocking reaction of diisocyanates with methyl ethyl ketoxime is a reversible reaction (12). In these nanocapsules, the polystyrene shell functions as a "shield" for the deblocked isocyanate by preventing the liberated blocking agent from re-entering the nanocapsule. Varying the degree of crosslinking of the polystyrene shell further exemplifies the "shield effect" (FIG. 3, the FTIR spectra of N3300A, BL3175A, and BL3175A after deblocking treatment are replotted for comparison). Subjecting the nanocapsule M-9 (no DVB crosslinker in the shell) to the deblocking treatment shows a small shoulder peak at 1725 cm$^{-1}$ indicating the presence of residual BNCO (FIG. 3f). The strong peak at 1725 cm$^{-1}$ seen upon deblocking the nanosphere M-1 and BL3175A blend indicates the effect of the polystyrene shell on the reaction between the isocyanate and the liberated blocking agent. Increasing the proportion of DVB from 2% (M-5) to 6% (M-11) results in shorter peaks at 1725 cm$^{-1}$ (FIGS. 3h and 3i). It is evident therefore that increased crosslinking of the polystyrene shell enhances the "shield effect".

The DSC profile of BL3175A exhibits a glass transition temperature ($T_g$) of −11.26° C. in the second heating cycle before the isocyanate deblocks at 136.59° C. The $T_g$ shifted to −2.51° C. in the next heating cycle and no deblocking peaks (~135° C.) were evident. However, this does not signify the complete deblocking of the blocked diisocyanates. For instance, the DSC profile of the thermally treated BL3175A (FIG. 1c), does not have a deblocking thermal peak in the heating cycle following isothermal treatment at 160° C. for 40 minutes but its IR spectrum shows the presence of residual blocked diisocyanates. Two distinct $T_g$s are discernible in the DSC profile of nanocapsule M-7. The first $T_g$ of ~−5° C. is attributed to the BNCO, and the second $T_g$ of ~105° C. is attributed to the presence of partially crosslinked polystyrene. The distinct and separate $T_g$s confirm different phases in the nanocapsules.

The effects of time and temperature on deblocking BL3175A were also noticed in the DSC thermograms of nanocapsules containing varying amounts of BNCO. Nanocapsules containing >20% BNCO exhibited exothermic responses after the second heating cycle, while nanocapsules containing <20% BNCO did not show similar responses. Additionally, higher degrees of crosslinking in the shell (DVB increased from 2 wt % to 6 wt %) also resulted in increased deblocking times. Higher crosslinking of the shell promotes the "shield effect". DSC analysis was conducted with open samples (no lid) and closed samples (pan capped with a small hole in the center). The thermal behaviors of both processes were similar except for the lack of exothermic responses in the open samples.

Example 2

Isocyanate Functional Cores Encapsulated by Hydroxyl or Amine Functionalized Shells This example discusses the synthesis of novel nanocapsules containing active isocyanates within hydroxyl or amine functionalized nanocapsule shells synthesized via miniemulsion polymerization. Desmodur® BL3175A was chosen as the core material for the nanocapsules. 2-Hydroxyethyl methacrylate (HEMA) and 2-(tert-butylamino)ethyl methacrylate (TBAEMA) were copolymerized with styrene using divinylbenzene (DVB) as the crosslinker to form the functionalized shell materials. The BNCO nanocapsules prepared via miniemulsion polymerization are summarized in Table 3. Desmodur N3300A was employed as the control for FTIR characterization.

TABLE 3

BNCO Nanocapsules

| Sample | % DVB* | % BNCO* | HEMA/S weight ratio | TBAEMA/S weight ratio | Particle size (nm) |
|---|---|---|---|---|---|
| M-4 | 2 | 0 | 0.25 | — | 61 |
| M-5 | 2 | 30 | 0.25 | — | 57 |
| M-6 | 0 | 30 | 0.25 | — | — |
| M-7 | 2 | 30 | — | 0.25 | 62 |
| M-8 | 2 | 0 | — | 0.25 | — |
| M-9 | 0 | 30 | — | 0.25 | — |

*Weight percentage on total monomer.

Pre-emulsion preparation. The pre-emulsion for nanocapsule M-5 was synthesized as follows: Part 1 (40 g styrene, 1 g DVB, 0.51 g AIBN, 10 g HEMA and 15.3 g Desmodur BL3175A), and Part II (1.32 g SDS, 0.95 g Igepal CO-887, and 220 g water) were blended magnetically in separate containers for 10 min at 25° C. Part II was poured into Part I under mechanical agitation, and the contents were stirred for 30 min at 1,800 rpm. The pre-emulsion was cooled to <5° C. before sonification using a Misonix® sonicator 3000 (until the particle size was <250 nm).

Emulsion polymerization. The pre-emulsion was transferred to a three-neck round bottom flask equipped with a mechanical stirrer, reflux condenser, and a nitrogen inlet, and degassed for 30 min. The temperature was raised to 70° C. and maintained for 8 hours to complete the polymerization.

Characterization. The latex was freeze dried (lyophilization) for 48 hours in the Freezemobile 35EL. Particle sizes were determined using Mirotrac® UPA 250. Latex particle sizes were recorded on a capillary hydrodynamic fractionator (CHDF 2000, Matec Applied Sciences, Northborough, Mass.).

For deblocking studies, the freeze dried samples were treated thermally in the DSC under a nitrogen atmosphere as summarized in Table 2 and characterized via FTIR.

Figure 4:
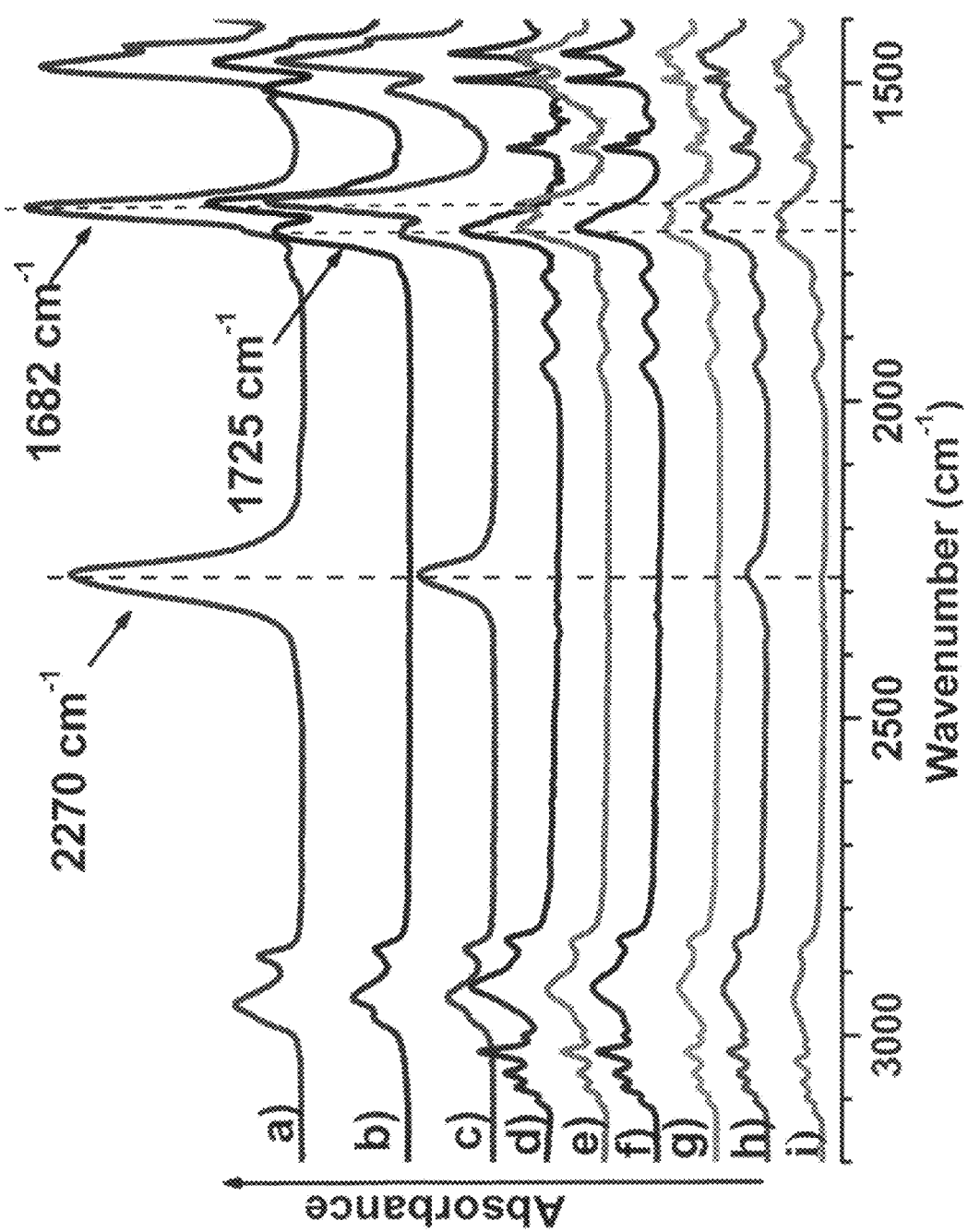
FIG. 4 depicts the FTIR spectra of a) N3300A, b) BL3175A, c) BL3175A after deblocking treatment, d) M-4, e) M-5, f) M-5 after acetone extraction, g) blend of M-4 and BL3175A after deblocking treatment, h) M-5 after deblocking treatment, and i) M-6 after deblocking treatment.

Isocyanate encapsulation was confirmed via FTIR characterization. FIG. 4a shows two characteristic peaks at 1682 $cm^{-1}$ (carbonyl) and 2270 $cm^{-1}$ (free NCO) of Desmodur N 3300A, while the BNCO shows distinct peaks at 1682 and 1725 $cm^{-1}$ (FIG. 4b). The nanocapsule M-5 (FIG. 4e) shows a characteristic BNCO peak at 1682 $cm^{-1}$ that is not seen in the FTIR spectrum of the empty nanosphere, M-4 (FIG. 4d). The peak at 1725 $cm^{-1}$ overlaps with the HEMA ester carbonyl of M-4.

The IR spectrum of M-5 treated with acetone to extract the encapsulated BNCO (FIG. 4f) shows the total disappearance of the BNCO peak at 1682 $cm^{-1}$ indicating that the blocked isocyanate was extracted from the nanocapsules by acetone, and suggesting the core (isocyanate)-shell structure of the nanocapsules.

For deblocking studies, nanocapsules M-6 were freeze dried and treated thermally in the DSC to release the blocking agent. FIGS. 4c, 4g, and 4h show the effects of deblocking treatment on BL3175A, M-4—BL3175A blend, and M-5, respectively. While the presence of the free isocyanate peak at 2270 $cm^{-1}$ indicates deblocking of BL3175A, the peak at 1725 $cm^{-1}$ suggests the presence of residual BNCO. IR spectra recorded via transmission technique on NaCl plate showed total disappearance of the 1725 $cm^{-1}$ peak.[14] After the deblocking treatment, nanocapsule M-5 showed the characteristic isocyanate peak at 2270 $cm^{-1}$ indicating the presence of free isocyanate functional groups. The functionalized nanocapsules are expected to have the hydroxyl/amine groups on the outside of the shell due to their hydrophilicity. When the blend of hydroxyl-functional empty nanosphere M-4 and BL3175A was subjected to the deblocking treatment (FIG. 4g), no peak was seen at 2270 $cm^{-1}$ suggesting that the isocyanate generated upon deblocking reacted with the hydroxyl groups present on the nanosphere. However, the isocyanate generated upon deblocking in nanocapsule M-5 is retained in the core of the nanosphere without reacting with the hydroxyl groups on the outside of the shell.

Figure 2:
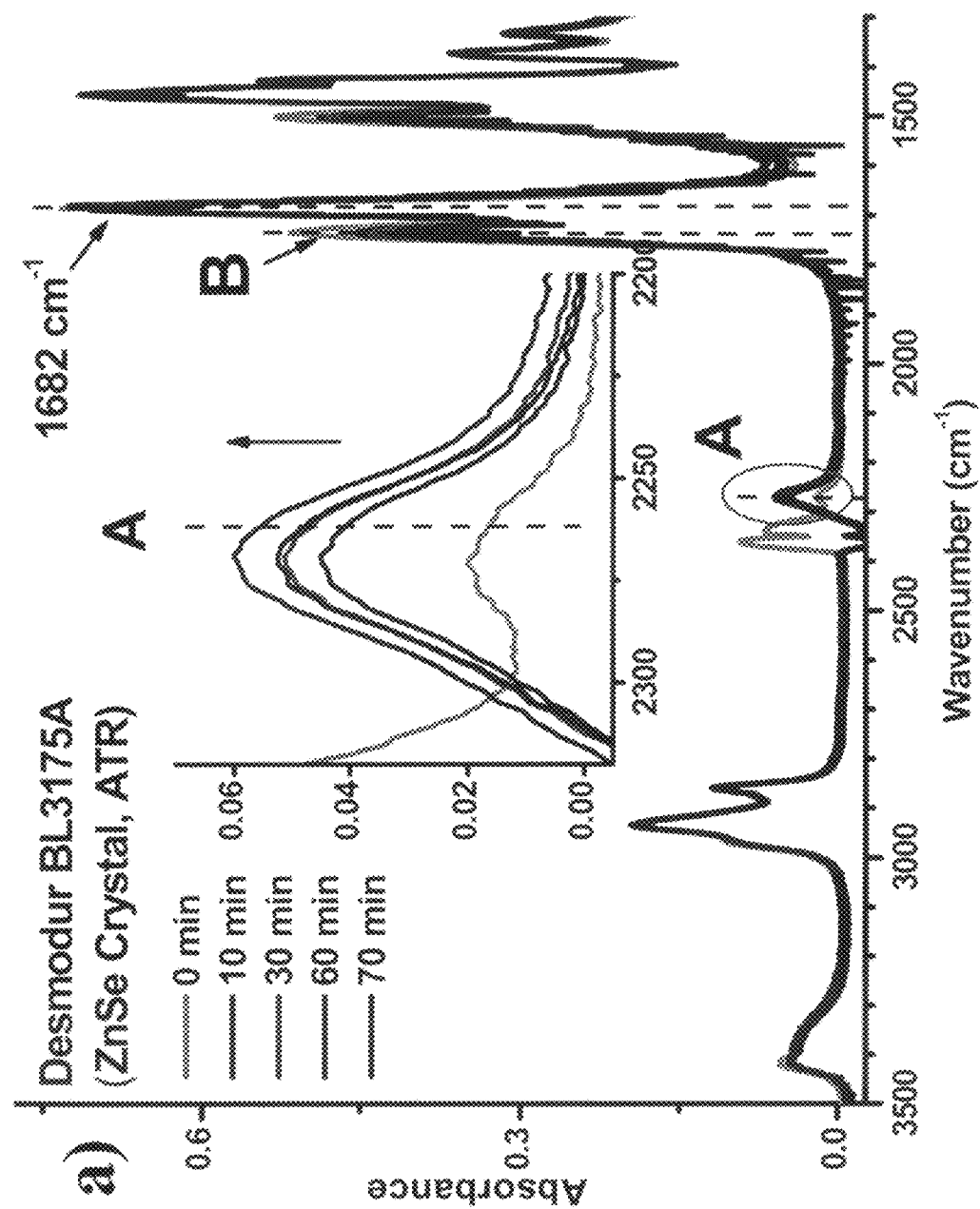
FIG. 2 depicts the FTIR spectra of BL3175A maintained isothermally for various times at 140° C. with a) ATR and b) transmission methods.
Figure 2:
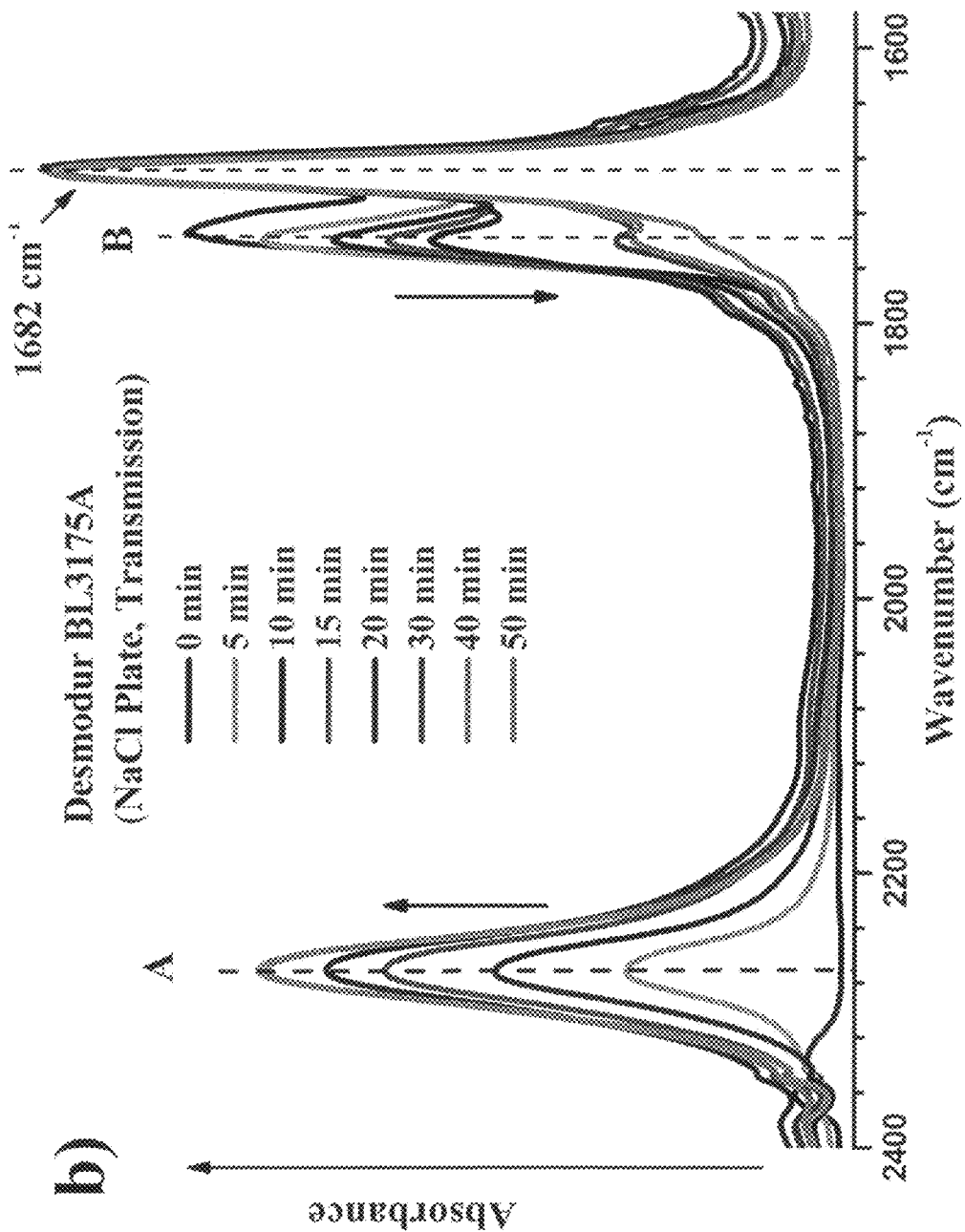

The effect of the degree of crosslinking on the shell is also demonstrated in FIG. 1. Unlike nanocapsule M-5 (2% DVB in the shell), the nanocapsule M-6 (no crosslinker in the shell) does not display the isocyanate peak at 2270 $cm^{-1}$ after deblocking thermal treatment (FIG. 4i). During deblocking treatment, the deblocked isocyanate flows from the nanocapsules with an uncrosslinked shell, and reacts with the hydroxyl groups in the shell. It is obvious therefore that DVB plays an important role as a crosslinker in confining the BNCO to the core of the nanocapsule.

Figure 5:
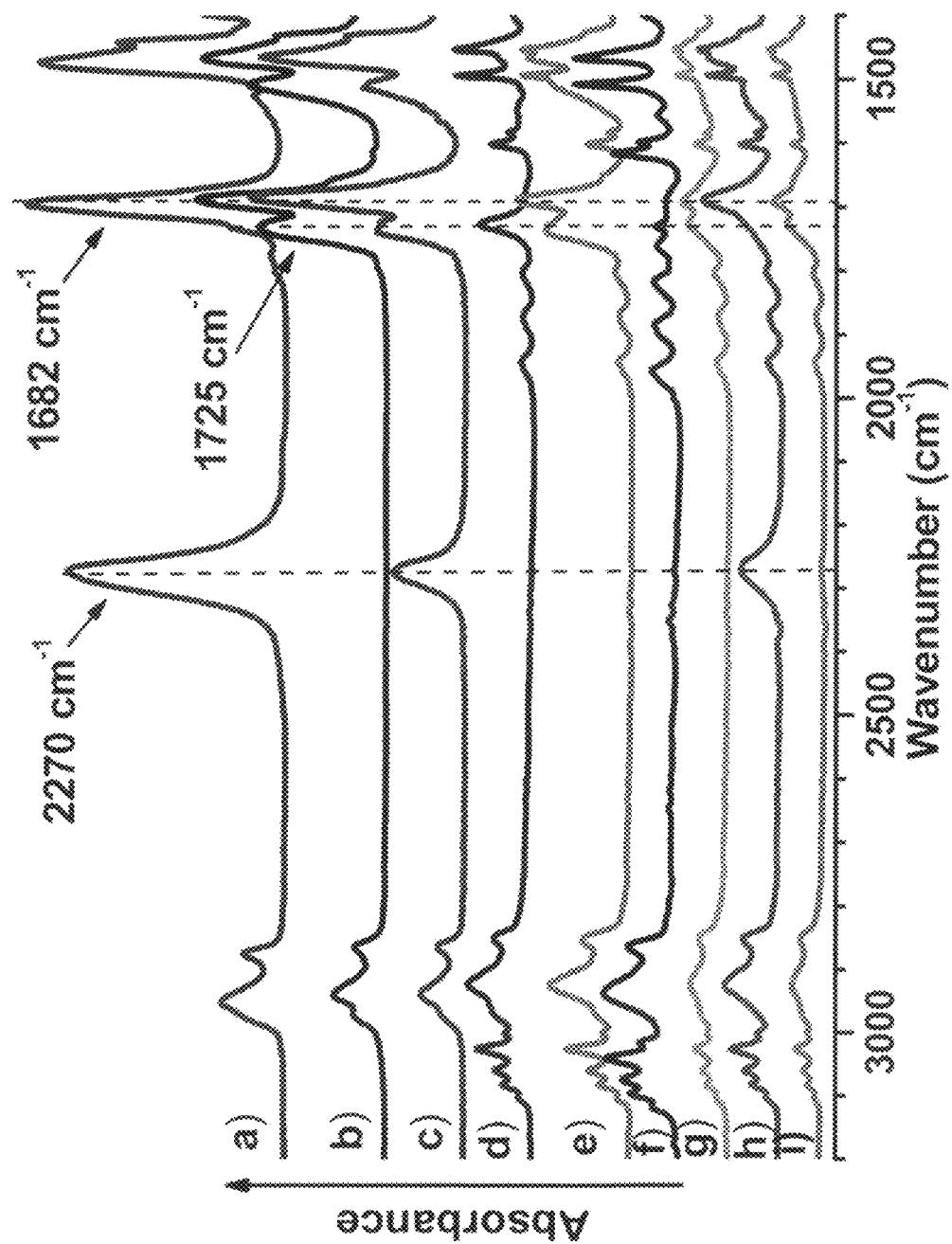
FIG. 5 depicts the FTIR spectra of a) N3300A, b) BL3175A, c) BL3175A after deblocking treatment, d) M-8, e) M-7, f) M-7 after acetone extraction, g) blend of M-8 and BL3175A after deblocking treatment, h) M-7 after deblocking treatment, and i) M-9 after deblocking treatment.

The nanocapsule M-7 (FIG. 5e) shows a characteristic BNCO peak at 1682 $cm^{-1}$ that is not observed in the FTIR spectrum of the empty nanosphere M-8 (FIG. 5d). The peak at 1725 $cm^{-1}$ overlaps with the TBAEMA ester carbonyl of M-8.

The IR spectrum of M-7 treated with acetone to extract the encapsulated BNCO (FIG. 5f) shows the total disappearance of the BNCO peak at 1682 $cm^{-1}$ indicating that the blocked isocyanate was extracted from the nanocapsules by acetone, and suggesting the core (isocyanate)-shell structure of the nanocapsules. FIGS. 5c, 5g, and 5h summarize the effect of deblocking treatment on BL3175A, M-8—BL3175A blend, and M-7, respectively (the FTIR spectra of N3300A and BL3175A are replotted for comparison). After deblocking treatment, nanocapsule M-7 exhibits the characteristic isocyanate peak at 2270 $cm^{-1}$ indicating the presence of free isocyanate functional group. This peak is not seen in the similarly treated blend of empty nanospheres M-8 and BL3175A (FIG. 5g) as the isocyanate generated upon deblocking reacts with the amine groups of TBAEMA present on the nanocapsule shell. However, the isocyanate generated upon deblocking in nanocapsule M-7 does not react with amine groups, and remains in the core as the dissociated free isocyanate.

The nanocapsule M-9 (FIG. 5i) without DVB crosslinker in the shell, does not depict an isocyanate peak at 2270 $cm^{-1}$ after deblocking treatment. As discussed earlier, it is believed that the deblocked isocyanate is able to flow from the uncrosslinked shell and react with the amine groups on the shell periphery.

Figure 6:
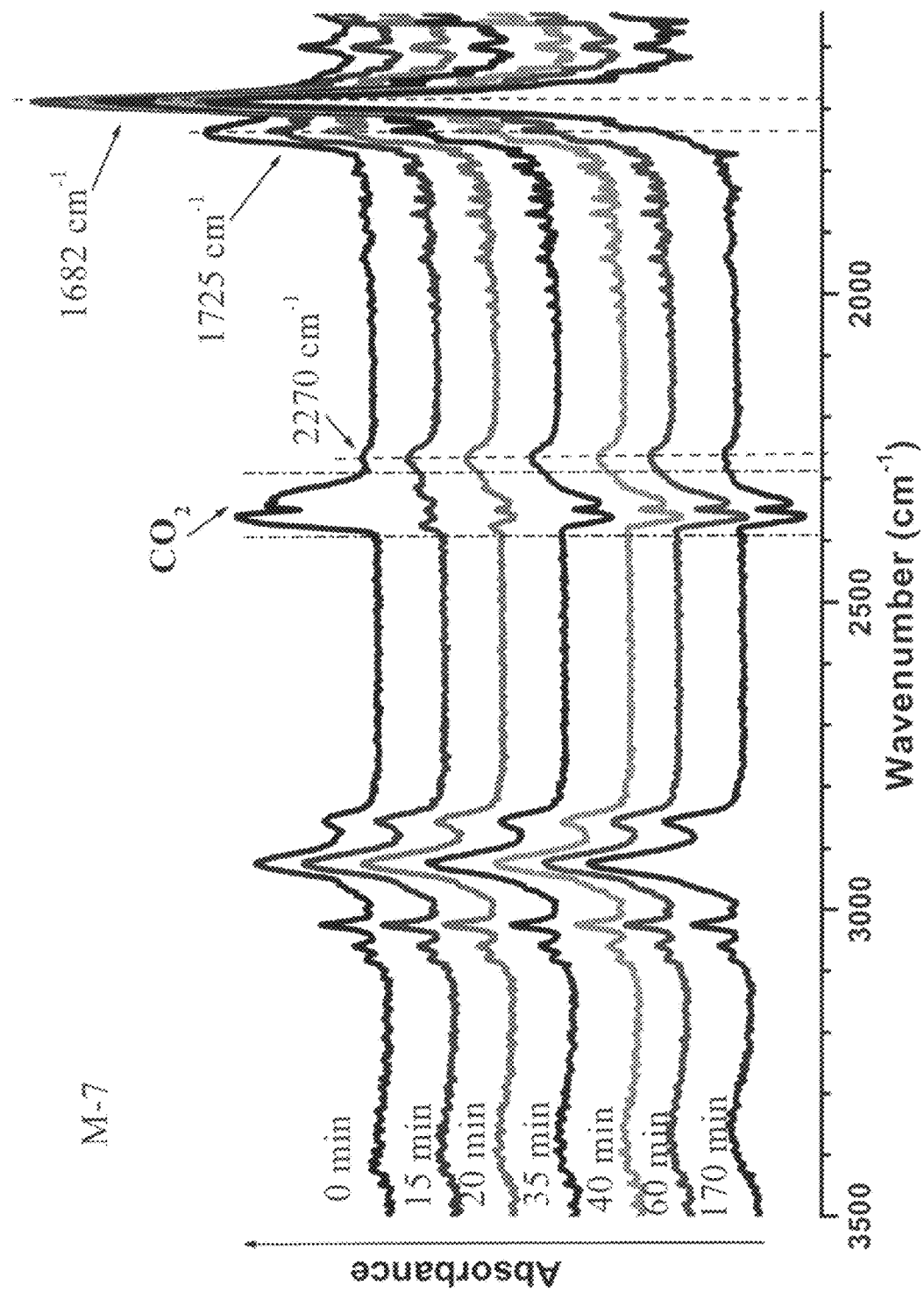
FIG. 6 depicts the FTIR spectra of M-7 maintained isothermally at 140° C.

Since isocyanate deblocking appeared to be a function of time, nanocapsule M-7 was heated isothermally at 140° C. for varying lengths of time (FIG. 6). The characteristic BNCO peak at 1725 $cm^{-1}$ decreased steadily with time. At 170 minutes, a small shoulder is seen which could represent the TBAEMA ester carbonyl peak. The isocyanate peak at 2270 $cm^{-1}$ confirms that the deblocked isocyanates were retained in the core of the nanocapsule and not consumed by the amine groups on the nanocapsule shell.

REFERENCES (1) Arshady, R. Microspheres, *Microcapsules & Liposomes Series, Volume* 1, 1999, London, United Kingdom.
(2) Jackson, L. S.; Lee, K. *Lebensm. Wiss. Technol.* 1991, 24, 289-297.
(3) Hildebrand, G. E.; Tack, J. W. *Int. J. Pharm.* 2000, 196, 173-176.
(4) Stenekes, R. J. H.; Loebis, A. E.; Fernandes, C. M.; Crommelin, D. J. A.; Hennink, W. E. *Int. J. Pharm.* 2001, 214, 17-20.
(5) Landfester, K. *Adv. Mater.* 2001, 13, 765-768.
(6) Qi, D.-M.; Bao, Y.-Z.; Weng, Z.-X.; Huang, Z.-M. *Polymer* 2006, 47, 4622-4629.
(7) Ni, K.-F.; Shan, G.-R.; Weng, Z.-X. *Macromolecules* 2006, 39, 2529-2535.
(8) Jang, J.; Bae, J.; Park, E. *Adv. Mater.* 2006, 18, 354-358.
(9) Couvreur, P.; Barratt, G.; Fattal, E.; Legamd, P.; Vauthier, C. *Cri. Rev. Ther. Drug Carrier Syst.* 2002, 19, 99-134.
(10) Matkan, J.; Treleaven, R. J. U.S. Pat. No. 4,681,806.
(11) Irii, S.; Shiozaki, T. JP 6,219,3641.
(12) Lee, W.-F.; Hwong, G.-Y. *Eur. Polym. J* 1997, 33, 1499-1504.
(13) Wicks, D. A., Wicks, Z W. *Prog. Org. Coat.* 1999, 36, 148-172.
(14) Wicks, D. A., Wicks, Z. W. *Prog. Org. Coat.,* 2001, 41, 1-83.

What is claimed is:

1. A nanocapsule comprising an active isocyanate encapsulated within at least one polymeric nanosphere, wherein the isocyanate has at least one blocking agent and wherein the nanocapsule is a latex particle and wherein the latex particle is freeze dried.

2. The nanocapsule of claim 1, wherein the nanosphere is composed of polystyrene, polymethyl (meth)acrylate, or copolymer combination thereof with polybutyl acrylate, polydivinyl benzene, polyethylene glycol dimethacrylate, or polytriethyleneglycol dimethacrylate.

3. The nanocapsule of claim 1 wherein the isocyanate is based on toluene diisocyanate, methane diphenyl diisocyanate (MDI), hexamethylene diisocyanate, isophorone diisocyanate, hydrogenate MDI, trimethyl hexamethylene diisocyanate, tetramethyl xylylene isocyanate, tetramethyl xylylene diisocyanate, xylylene diisocyanate, isocyanate dimers, isocyanate trimers, polyisocyanates, or polydiisocyanates.

4. The nanocapsule of claim 1, wherein the nanosphere is functionalized.

5. The nanocapsule of claim 1, wherein the nanosphere is functionalized with a hydroxyl, carboxyl, epoxy, amide or amine group.

6. The nanocapsule of claim 1 wherein the blocking agent is a phenol, alcohol, oxime, dicarbonyl, hydroxamic acid ester, triazole, lactam, aminimide, imidazoline, imidazole, tetrahydropyrimidine, nitrile carbonate or nitrile oxide.

7. The nanocapsule of claim 1 wherein the blocking agent is methyl ethyl ketoxime.

8. A method of encapsulating an active isocyanate within at least one polymeric nanosphere of the nanocapsule of claim 1 via miniemulsion polymerization comprising:

blending singular or blends of monomers that form a polymeric shell, a crosslinker, a free radical initiator, and a blocked diisocyanate in a container;

blending a water blend comprising surfactant and water in a container;

combining and stirring the water blend and the monomer blend to make a pre-emulsion; cooling the pre-emulsion;

sonicating the pre-emulsion;

degassing the pre-emulsion;

heating the pre-emulsion to a temperature ranging from about 25° C. to about 90° C.; maintaining the temperature to complete polymerization; and recovering the nanocapsule according to claim 1 by freeze drying the latex particle.

9. The method of claim 8 wherein the crosslinker is divinylbenzene.

10. The method of claim 8 wherein the crosslinker ranges from about 0% to about 6% weight of the monomer.

11. The method of claim 8 wherein the surfactant is sodium dodecyl sulfate.

12. The method of claim 8 wherein the surfactant is nonyl phenol comprising 30 mole ethoxylate.

13. The method of claim 8 wherein the blocked diisocyanate is methyl ethyl ketoxime blocked hexamethylene diisocyanate.

14. The method of claim 8 wherein the monomer is styrene.

15. The method of claim 14 wherein the blocked diisocyanate ranges from about 10% to about 30% weight of the styrene.

16. The method of claim 8, wherein the monomer is a singular or blend of acrylates, methacrylates, styrene, vinyl acetates, acrylamide derivatives, divinyl benzene, ethylene glycol dimethacrylate or triethyleneglycol dimethacrylate.

17. The method of claim 14 wherein the styrene blend further comprises 2-hydroxyethyl methacrylate and 2-(tert-butylamino)ethyl methacrylate.

18. The method of claim 8 further comprising the step of treating the nanocapsule thermally to release the blocking agent from the blocked diisocyanate.

19. The method of claim 8 wherein the isocyanate is based on toluene diisocyanate, methane diphenyl diisocyanate (MDI), hexamethylene diisocyanate, isophorone diisocyanate, hydrogenate MDI, trimethyl hexamethylene diisocyanate, tetramethyl xylylene isocyanate, tetramethyl xylylene diisocyanate, xylylene diisocyanate, isocyanate dimers, isocyanate trimers, polyisocyanate, or polydiisocyanate.

20. The nanocapsule of claim 1 wherein the nanosphere is crosslinked with divinylbenzene.

21. The nanocapsule of claim 1, wherein the at least one blocking agent is releasable from the active isocyanate upon thermal treatment, isothermal treatment, or UV exposure.

\* \* \* \* \*